Dec. 4, 1945.  J. W. OVERBEKE  2,390,319

PRESSURE VESSEL

Filed Dec. 28, 1943

INVENTOR.
John William Overbeke
BY
M. J. Herold
ATTORNEY

Patented Dec. 4, 1945

2,390,319

UNITED STATES PATENT OFFICE 2,390,319

PRESSURE VESSEL

John William Overbeke, New York, N. Y., assignor to Simmonds Aerocessories, Inc. of New York, New York, N. Y., a corporation of New York Application December 28, 1943, Serial No. 515,933

4 Claims. (Cl. 138—30)

This invention relates to pressure vessels such as accumulators and surge relievers of the kind used in aircraft, boats and other installations wherein a fluid is stored or pumped under pressure, and more particularly to those forms of hydraulic system pressure accumulators wherein a noncompressible fluid such as oil and a compressible fluid such as air are charged under pressure in a shell where they are separated by a flexible membrane.

General objects of the invention are to provide pressure vessels of the mentioned types having improved features of construction leading to better performance, easier manufacture, and readier assembly and disassembly.

In a copending application of John W. Overbeke, Serial No. 516,167, filed Dec. 30, 1943, there is shown and generically claimed a pressure vessel of the kind herein contemplated, characterized by novel means for closing and sealing the shell mouth and clamping the membrane in position. Particular objects of this invention are to provide accumulators having the generally improved features of construction of the mentioned copending application, together with additional improvements giving great strength coupled with extreme ease in attaching the membrane within the shell and assembling or removing the closure parts, without need for special tools.

Other objects of the invention will in part be obvious and will in part appear hereinafter.

The invention accordingly comprises the features of construction, combination of elements, and arrangement of parts, which will be exemplified in the construction hereinafter set forth, and the scope of which invention will be indicated in the claims.

For a fuller understanding of the nature and objects of the invention reference should be had to the following detailed description taken in connection with the accompanying drawing, in which.

Figure 1:
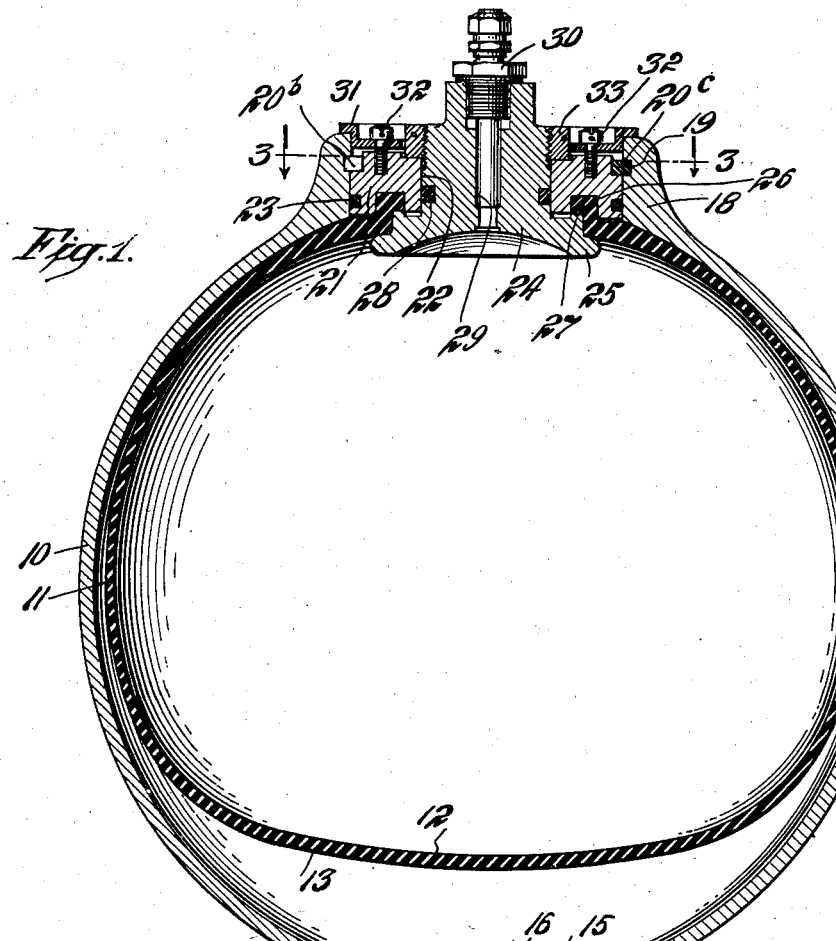
Fig. 1 is a vertical sectional view through a pressure accumulator embodying features of the invention.
Figure 2:
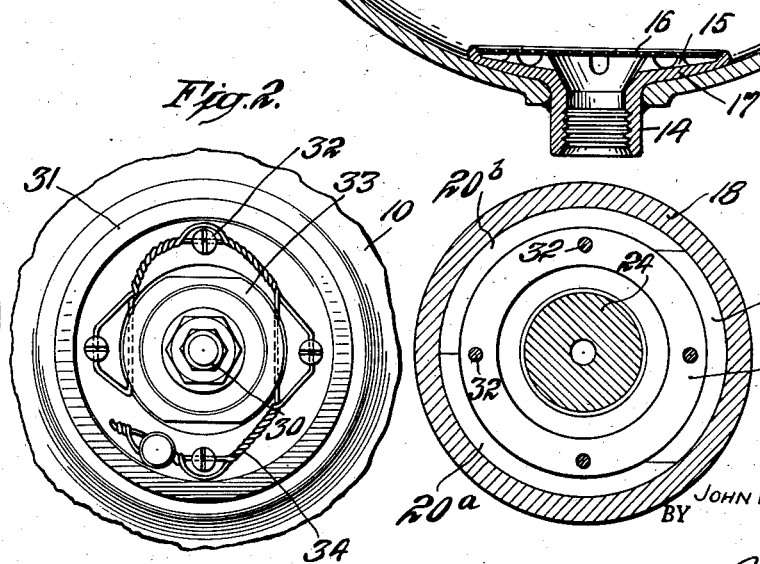
Fig. 2 is a fragmentary plan view of the assembled accumulator.

Referring more particularly to the drawing there is shown an accumulator having a shell 10 which may be of any suitable size and type, being here shown in the form of a spherical steel shell.

Within the shell is a rubber or rubber like membrane 11 which in the present instance is shown as being of bag-like construction occupying the larger part of the shell interior when in inert condition, and having sufficient elasticity to expand up against the shell walls, assuring complete emptying of the liquid from the accumulator when service conditions so demand. The bag-like membrane divides the shell interior into an air compartment 12 and an oil compartment 13.

In the oil compartment there is fitted an oil passing plug 14 which is threaded or otherwise suitably prepared for connection with the hydraulic system tubing. Such plug comprises a perforate plate 15 resting against supporting ribs 16, carried on an enlarged hollow head 17 of the oil plug. Details of this liquid passing plug are more fully described and are claimed in my copending application Serial No. 515,934, filed Dec. 28, 1943.

Figure 3:
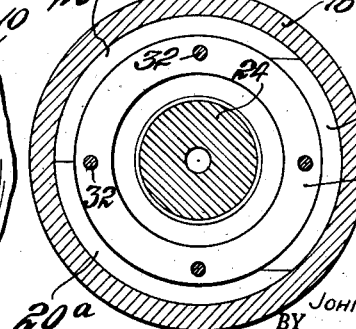
Fig. 3 is a horizontal sectional view along line 3—3 of Fig. 1.

On the other end of the shell are the closure and membrane attaching means the features of which more particularly characterize the present invention. These include a wide mouth or neck 18, capable of allowing insertion of the enlarged head 17 of the oil plug and having a thickened wall structure obtainable by accumulating excess metal from the hot spinning process by which the shell is preferably formed. On the inside of this mouth an annular groove 19 is provided which accommodates a segmented locking ring 20, of steel having high shear resistance, formed of three sections 20a, 20b, and 20c as is best shown in Fig. 3. As illustrated, these ring sections are so shaped that the entire ring can be assembled in the groove 19 by inserting 20c last, and it can be disassembled by removing section 20c first. Beneath the locking ring 20 there is a collar 21 which together with the mouth 18 forms a constricted neck portion having a central opening 22. A rubber or other sealing ring 23 is preferably disposed between the collar and shell mouth.

A stopper 24 is slidably fitted in the central collar opening 22 for outward movement. On the lower end of the stopper there is a stepped flange 25 underlying the lower face of the collar 21 which is grooved as at 26. Within this groove and over the stepped face of the flange 25 there is clamped the edge 27 of the membrane 11, this edge being molded to a proper configuration to fit between the named parts, and being cured so as to retain sufficient plasticity to be deformable when squeezed.

Since the stopper 24 is outwardly slidable through the neck closure, interior pressures within the accumulator force its flange 15 against the membrane edge 27 and seal the latter with a force that increases in response to interior shell pressures. Preferably an additional rubber or other suitable sealing ring 28, of conventional form, is disposed between the stopper and the collar. The stopper 24 has an air passage 29 within which is fitted a back check valve 30 through which the membrane may be loaded with trapped air.

The collar 21 is held against dropping inwardly away from the locking ring 20 by means of a holding ring 31 which overlies the outer end of mouth 18 and is pinned to the collar by means of screws 31. If wanted, the holding ring 31 may overlie and be arrested directly by the locking ring 20. The stopper 24 is similarly held against inward movement through the collar by means of a nut 33 threaded on its outer end. This nut and the pins 32 are preferably held against unwanted loosening by a locking wire 34.

In assembly the oil plug 14 is first inserted through the inside of the shell and welded, brazed, or otherwise suitably attached in place. The membrane 11, which it will be noted can be handled as a unit with the stopper 24, collar 21, and lock nut 23, is assembled within the shell with these named parts which may be dropped sufficiently below the locking ring groove 19 to permit insertion of the several sections of the segmented ring. The closure is then drawn up to the locking ring by means of the screws 32 and holding ring 31. The accumulator is then ready for insertion in a hydraulic system by means of the oil plug 14, after which the membrane can be charged with air under pressure introduced through the valve 30. The pressure as initially charged may vary within wide limits, but a typical installation may have an initial pressure of 600 p. s. i. when the membrane is fully expanded and there is no oil under pressure within the shell. This initial compression may be increased to an operating pressure of around 1500 p. s. i. when the membrane and its contained air is compressed by introduction of oil under pressure in the oil chamber 13. The accumulator construction is rugged enough to handle much higher pressures if wanted, those mentioned being cited only as exemplifying current practice.

It will be seen that the membrane 22 is sealed very tightly in response to the interior shell pressures, and that the various parts are each ruggedly constructed to withstand the forces to which they are subjected.

While the invention has been particularly described with reference to an oleopneumatic accumulator, certain features will be found useful in systems employing other fluids, and in pressure vessels generally, whether of the accumulator type or not.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A pressure accumulator comprising, in combination, a shell having an open neck at one end, a centrally open collar snugly fittable within said neck, a stopper outwardly slidable in the central opening of said collar and having a flange at its lower end underlying said collar, a flexible bag-like membrane having its edges disposed between said flange and collar and adapted to be clamped therebetween when said slidable stopper is subjected to interior bag pressure, said collar, membrane and stopper being capable of preassembly as a unit which can be inserted through said shell neck from outside the shell to divide said shell into compartments, a locking ring fastenable in said shell neck above said collar after said unit has been inserted, and means for passing fluid in and out of said compartments.

2. A pressure accumulator comprising, in combination, a shell having an open neck at one end, a centrally open collar snugly fittable within said neck, a stopper having a body slidable in and projecting above the central opening of said collar and having a flange at its lower end underlying said collar, a flexible bag-like membrane having its edges disposed between said flange and collar and adapted to be clamped therebetween when said slidable stopper is subjected to interior membrane pressure, a holding means fastenable to the upwardly projecting part of said stopper to hold it, said membrane and said collar together as a subassembly capable of being inserted as a unit through said shell neck from outside the shell whereby said membrane divides said shell into compartments, locking means fastenable in said neck above said collar after said unit has been inserted, and means for passing fluid in and out of said compartments.

3. A pressure accumulator comprising, in combination, a shell having an open neck at one end, a centrally open collar snugly fittable within said neck, a stopper having a body slidable in and projecting above the central opening of said collar and having a flange at its lower end underlying said collar, a flexible bag-like membrane having its edges disposed between said flange and collar and adapted to be clamped therebetween when said slidable stopper is subjected to pressure from within said membrane, holding means fastenable to the upwardly projecting part of said stopper to hold it, said membrane and said collar together as a subassembly capable of being inserted as a unit through said neck from outside the shell whereby said membrane divides said shell into compartments, locking means fastenable in said neck above said collar to hold said subassembly parts against outward release under interior shell pressure, holding means fastenable above said collar and said locking means to hold said subassembly against dropping inwardly when there is no interior shell pressure, and means for passing fluid in and out of said compartments.

4. A pressure accumulator comprising, in combination, a shell having an open neck at one end having an internal annular groove, a closure for said neck comprising a subassembly having a collar fittable in said neck, a stopper fittable beneath said collar and a flexible membrane having its edges clamped between said collar and stopper, said subassembly being insertable through said neck from outside the shell as a unit, a locking ring insertable in said annular groove above said collar to prevent outward release of said subassembly, and means for passing fluid in and out of said accumulator on opposite sides of said membrane.

JOHN WILLIAM OVERBEKE.